United States Patent
Mon et al.

(10) Patent No.: US 6,275,755 B1
(45) Date of Patent: Aug. 14, 2001

(54) VEHICLE IMPACT SEVERITY IDENTIFICATION DEVICE

(75) Inventors: Yi-Jen Mon, Hsin-Chu; Kuang-Tso Luo, Taipei; Yeah-Min Lin, Chung-Li, all of (TW)

(73) Assignee: Chung Shan Institute of Sorence and Technology, Tao-Yuan Hsien (TW)

( * ) Notice: Subject to any disclaimer, the term of this patent is extended or adjusted under 35 U.S.C. 154(b) by 0 days.

(21) Appl. No.: 09/484,427

(22) Filed: Jan. 18, 2000

(51) Int. Cl.$^7$ .................................................. G05D 1/00
(52) U.S. Cl. .............................. 701/45; 180/271; 340/436
(58) Field of Search ............................. 701/45; 180/271; 280/734; 340/436, 903

(56) References Cited

U.S. PATENT DOCUMENTS

| | | | |
|---|---|---|---|
| 5,343,394 | * | 8/1994 | Takeuchi et al. ........................ 701/45 |
| 5,559,697 | * | 9/1996 | Wang ...................................... 701/45 |
| 5,563,791 | * | 10/1996 | Gioutsos ................................. 701/45 |
| 5,583,771 | * | 12/1996 | Lynch et al. ............................ 701/45 |
| 5,990,572 | * | 11/1999 | Yasakuni et al. ...................... 280/734 |
| 6,064,928 | * | 5/2000 | Wilson et al. ......................... 280/735 |
| 6,079,738 | * | 6/2000 | Lotito et al. .......................... 280/735 |
| 6,167,945 | * | 1/2001 | Bachmaier ............................. 701/45 |
| 6,169,947 | * | 1/2001 | Fakui et al. ........................... 180/271 |
| 6,186,539 | * | 2/2001 | Foo et al. .............................. 701/45 |

FOREIGN PATENT DOCUMENTS

405187885 * 7/1993 (JP) ........................................ 701/45

* cited by examiner

*Primary Examiner*—Richard M. Camby
(74) *Attorney, Agent, or Firm*—Winston Hsu

(57) ABSTRACT

A vehicle impact severity identification device comprises an acceleration detector for generating a vehicle impact acceleration signal. The impact severity identification circuit uses the acceleration signal generated by the acceleration detector and generates an impact severity identification signal at its output port. During an frontal impact, when the acceleration signal exceeds a predetermined start value, the impact severity identification circuit will identify whether the impact is a severe impact based upon a displacement generated from the acceleration signal during a predetermined period. If the impact is not a severe impact or cannot be determined, then the impact severity identification circuit will successively identify the impact severity based upon the displacement generated by the acceleration signal, a cumulated number of times that a jerk of the acceleration signal exceeds a threshold value, and the time interval that the jerk first exceeds the threshold value, until the identification signal is generated and outputted.

7 Claims, 14 Drawing Sheets

|   | IF | | | | THEN | |
|---|---|---|---|---|---|---|
|   | disp1 | disp2 | tw | njerk | svty | First Stage |
| 1 | VH | any | any | any | Severe Impact | |
| 2 | H | H | L | H | Severe Impact | |
| 3 | M | H | L | H | Severe Impact | |
| 4 | VL | M | L | H | Moderate Impact | Second Stage |
| 5 | H | H | M | M | Moderate Impact | |
| 6 | M | H | M | M | Moderate Impact | |
| 7 | M | H | H | L | Moderate Impact | |
| 8 | L | H | H | H | Moderate Impact | |
| 9 | M | H | H | H | Moderate Impact | |
| 10 | L | M | H | L | Light Impact | |

VH : Very high
H : High
M : Medium
L : Low
VL : Very low

Fig. 5

| Fuzzy Variables | Class | Linguistic Terms |
|---|---|---|
| disp1 | Input | very_low, low, medium, high, very_high |
| disp2 | Input | low, medium, high |
| njerk | Input | low, medium, high |
| tw | Input | low, medium, high |
| svty | Output | low, medium, high |

Fig. 6

Sample rate : 500us (csist)
AKF 1 crash severity sensing

| Pulse code AKF... | Time to fire test data | Severity test data | Trigger time requirements | | | | Test mode and speed |
| --- | --- | --- | --- | --- | --- | --- | --- |
| | | | 1-st infl. Stage | | 2-nd infl. stage | | |
| | | | unbelted | belted | unbelted | belted | |
| 013 03 | - | L | - | - | - | - | full barrier 13kph |
| 013 11 | - | L | - | - | - | - | full barrier 13kph |
| 013 12 | - | L | - | - | - | - | full barrier 13kph |
| 013 19 | - | L | - | - | - | - | full barrier 13kph |
| 013 20 | - | L | - | - | - | - | full barrier 13kph |
| 013 21 | - | L | - | - | - | - | full barrier 13kph |
| 013 22 | - | L | - | - | - | - | full barrier 13kph |
| 013 29 | - | L | - | - | - | - | full barrier 13kph |
| 013 30 | - | L | - | - | - | - | full barrier 13kph |
| 013 31 | - | L | - | - | - | - | full barrier 13kph |
| 013 32 | - | L | - | - | - | - | full barrier 13kph |
| 013 33 | - | L | - | - | - | - | full barrier 13kph |
| 013 34 | - | L | - | - | - | - | full barrier 13kph |
| 013 35 | - | L | - | - | - | - | full barrier 13kph |
| 013 36 | - | L | - | - | - | - | full barrier 13kph |
| 022 04 | 15 | M | 32 | - | - | - | full barrier 22kph |
| 022 13 | 11 | M | 32 | - | - | - | full barrier 22kph |
| 022 26 | 11 | M | 32 | - | - | - | full barrier 22kph |
| 022 27 | 15 | M | 32 | - | - | - | full barrier 22kph |
| 022 28 | 11 | M | 32 | - | - | - | full barrier 22kph |
| 022 37 | 15 | M | 32 | - | - | - | full barrier 22kph |
| 022 38 | 15 | M | 32 | - | - | - | full barrier 22kph |
| 022 39 | 15 | M | 32 | - | - | - | full barrier 22kph |
| 049 15 | 9 | H | 14 | 19 | 19 | - | full barrier 49kph |
| 049 47 | 9 | H | 14 | 19 | 19 | - | full barrier 49kph |
| 049 48 | 9 | H | 14 | 19 | 19 | - | full barrier 49kph |
| 049 49 | 9 | H | 14 | 19 | 19 | - | full barrier 49kph |
| 049 50 | 9 | H | 14 | 19 | 19 | - | full barrier 49kph |
| 049 51 | 9 | H | 14 | 19 | 19 | - | full barrier 49kph |
| 049 52 | 9 | H | 14 | 19 | 19 | - | full barrier 49kph |
| 049 53 | 9 | H | 14 | 19 | 19 | - | full barrier 49kph |
| 056 14 | 8 | H | 15 | 20 | 20 | 20 | full barrier 56kph |
| 056 40 | 9 | H | 15 | 20 | 20 | 20 | full barrier 56kph |
| 056 41 | 9 | H | 15 | 20 | 20 | 20 | full barrier 56kph |
| 056 42 | 9 | H | 15 | 20 | 20 | 20 | full barrier 56kph |
| 056 43 | 8 | H | 15 | 20 | 20 | 20 | full barrier 56kph |
| 056 44 | 9 | H | 15 | 20 | 20 | 20 | full barrier 56kph |
| 056 45 | 9 | H | 15 | 20 | 20 | 20 | full barrier 56kph |
| 056 46 | 9 | H | 15 | 20 | 20 | 20 | full barrier 56kph |
| 116 06 | - | L | - | - | - | - | offset pole 16kph |
| 127 05 | - | L | - | - | - | - | centre pole 27kph |
| 231 09 | - | L | - | - | - | - | car to car 31kph |
| 259 10 | 15 | M | 42 | - | - | - | car to car 59kph |
| 335 07 | 15 | M | 32 | - | - | - | 30° angle barrier right 35kph |
| 813 01 | - | L | - | - | - | - | under carriage hook-up 13kph |
| 813 02 | - | L | - | - | - | - | under carriage hook-up 13kph |
| 813 16 | - | L | - | - | - | - | under carriage hook-up 13kph |
| 813 17 | - | L | - | - | - | - | under carriage hook-up 13kph |
| 813 18 | - | L | - | - | - | - | under carriage hook-up 13kph |
| 813 23 | - | L | - | - | - | - | under carriage hook-up 13kph |
| 813 24 | - | L | - | - | - | - | under carriage hook-up 13kph |
| 813 25 | - | L | - | - | - | - | under carriage hook-up 13kph |

Fig. 12

Sample rate : 98us(csist)
AKF 2

| name of crash | name | crash type | optimal Time to fire for driver airbag | Time limit to fire pretensionneers | Severity Test data | Time to Fire Test data |
|---|---|---|---|---|---|---|
| f85 | 58b0s.c00 | 0 °57 | 18 | 19 | H | 7 |
| f113 | 57b0s.c00 | 0 °57 | 21 | 20 | H | 8 |
| g01 | 56b0s.c00 | 0 °57 | 20 | 19 | H | 7 |
| g80 | 59b0s.c00 | 0 °57 | 21 | 21 | H | 5 |
| h26 | 57e7f.c00 | 0 °57 | 20 | 29 | H | 7 |
| h49 | 57e6f.c00 | 0 °57 | 19 | 17 | H | 7 |
| h22 | 57c3f.c00 | 30° G57 | 31 | 26 | M | 13 |
| g02 | 55o8s.c00 | AMS G 55 | 32 | 28 | M | 13 |
| h46 | 55a2f.c00 | AMS G 55 | 32 | 24 | M | 15 |
| g42 | 50b2s.c00 | 30° G 50 | 37 | 26 | M | 13 |
| h40 | 50c2f.c00 | 30° G 50 | 37 | 24 | M | 15 |
| h33 | 35a1f.c00 | AMS G 35 | Fire | Fire | M | 13 |
| f135 | 20b0s.c00 | 0° 20 | No Fire | Fire | M | 15 |
| g55 | 16o8s.c00 | DAN 15 | No Fire | No Fire | L | - |
| h09 | 18e1f.c00 | DAN 0 °18 | No Fire | Fire | M | 15 |

H : High protection
M : Mediem protection
NC : Low protection

Fig. 13

VEHICLE IMPACT SEVERITY IDENTIFICATION DEVICE

BACKGROUND OF THE INVENTION

1. Field of the Invention

The present invention relates to a vehicle impact severity identification device, and more particularly, to a vehicle impact severity identification device for identifying the front-impact severity of a vehicle.

2. Description of the Prior Art

Airbags have been standard accessories of cars for quite some time. Now, Whether an airbag should trigger or not depends upon the front-impact severity of the car. There are several prior art algorithms for determining when an airbag should trigger, such as energy and variation of energy analysis, sliding windows algorithms, or analysis of acceleration and variation of acceleration. There also exists a method for triggering an airbag when the integral of the acceleration detected by an acceleration detector exceeds a certain threshold value. However, each of these methods has both advantages and disadvantages, and none of them can consistently identify when an airbag should be triggered. It would be very beneficial, then, if there existed an algorithm that could more precisely identify the severity of a vehicle impact and provide that identification information to an airbag-triggering electrical control unit.

SUMMARY OF THE INVENTION

It is therefore a primary objective of the present invention to provide a vehicle impact identification device for identifying the front-impact severity of a vehicle.

Briefly, in a preferred embodiment, the present invention provides a vehicle impact severity identification device for identifying the front-impact severity of a vehicle. The vehicle impact severity identification device comprises:

an acceleration detector installed in the vehicle for detecting the acceleration of the vehicle and generating an acceleration signal; and an impact severity identification circuit installed in the vehicle and electrically connected to the acceleration detector for identifying the impact severity of the vehicle, the identification circuit using the acceleration signal generated by the acceleration detector and generating an impact severity identification signal at an output port of the impact severity identification circuit;

wherein, during an impact, when the acceleration value of the acceleration signal exceeds a predetermined start value, the impact severity identification circuit will identify whether the impact is a severe impact based upon a displacement generated from the acceleration signal during a predetermined period; wherein, if the impact is not a severe impact, then the impact severity identification circuit will successively identify the impact severity based upon the displacement generated by the acceleration signal, a cumulated number of times that a jerk of the acceleration signal exceeds a threshold value, and the time interval that the jerk first exceeds the threshold value, until the identification signal is generated and outputted.

It is an advantage of the present invention that the vehicle impact severity identification device can precisely identify the severity of a vehicle impact and correctly determine if an airbag should be triggered.

These and other objectives and advantages of the present invention will no doubt become obvious to those of ordinary skill in the art after having read the following detailed description of the preferred embodiment that is illustrated in the various figures and drawings.

BRIEF DESCRIPTION OF THE DRAWINGS

FIG. 5 is a table of fuzzy rules according to the impact severity identification circuit as shown in FIG. 3.

FIG. 6 is a correspondence table of linguistic terms and fuzzy variables of the impact severity identification circuit shown in FIG. 3.

FIG. 12 is a table of the testing results of impact severity identification circuit of the present invention based on the impact pulse data set AKF1.

FIG. 13 is a table of the testing results of impact severity identification circuit of the present invention based on the impact pulse data set AKF2.

DETAILED DESCRIPTION OF THE PREFERRED EMBODIMENT

Figure 1:
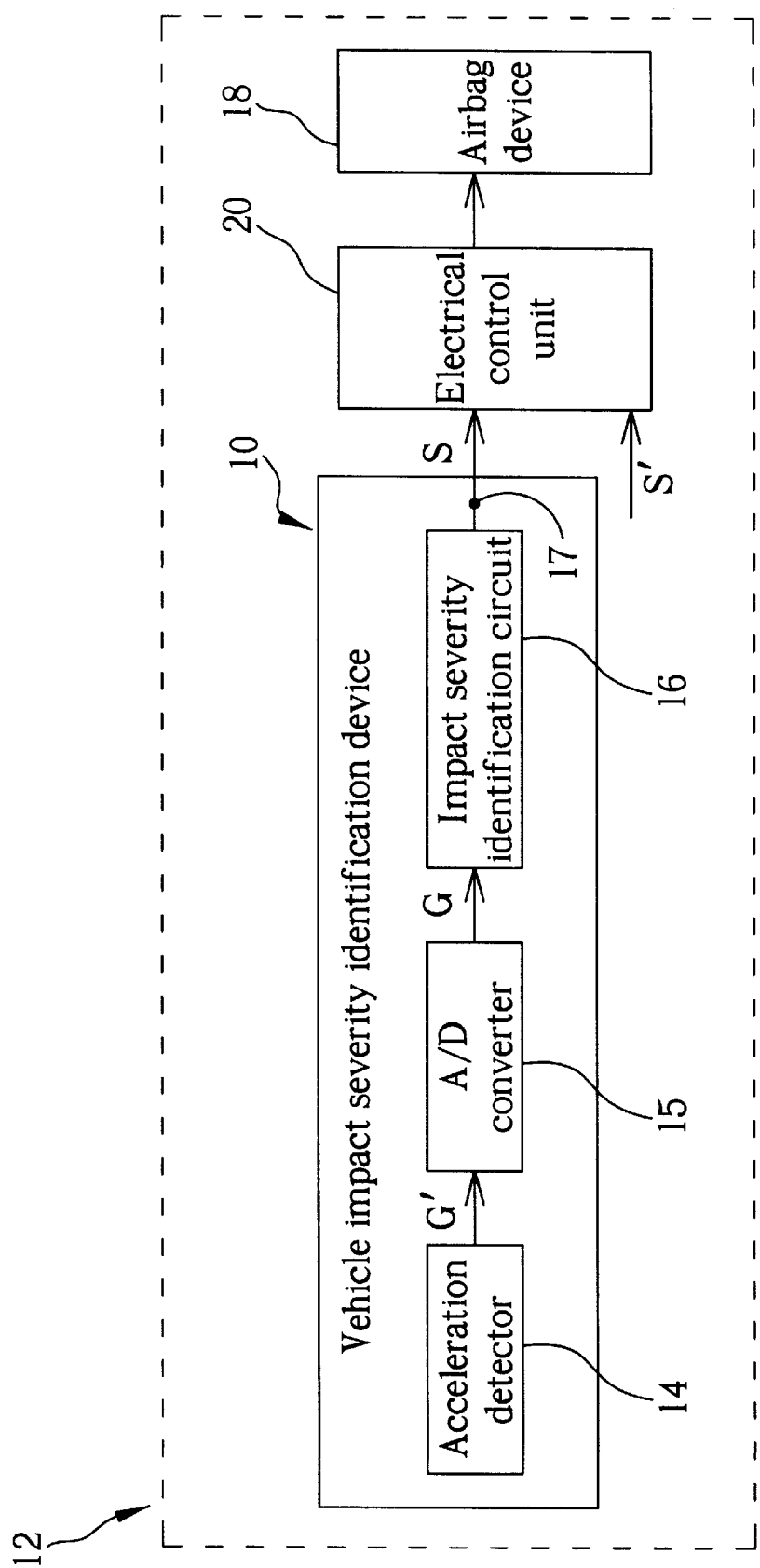
FIG. 1 is a functional block diagram of a vehicle impact severity identification device according to the present invention.

Please refer to FIG. 1. FIG. 1 is a functional block diagram of a vehicle impact severity identification device 10 according to the present invention. The present invention relates to the vehicle impact severity identification device 10 for identifying the front-impact severity of a vehicle 12. The vehicle impact severity identification device 10 comprises an acceleration detector 14 installed along the center line of the vehicle 12 for detecting the deceleration of the vehicle 12 and generating an acceleration signal G', an A/D (analog to digital) converter 15 electrically connected to the acceleration detector 14 for converting the acceleration signal G' to a digital acceleration signal G, and an impact severity identification circuit 16 electrically connected to the A/D converter 15 for identifying the impact severity of the vehicle 12 according to the digital acceleration signal G and generating an identification signal S at its output port 17. In addition, the vehicle 12 comprises an airbag device 18, and an electrical control unit (ECU) 20 electrically connected to the airbag device 18 and the vehicle impact severity identification device 10. The electrical control unit 20 is used to control the triggering of the airbag device 18 according to the identification signal S generated by the vehicle impact severity identification device 10 and a corresponding signals S' about the dynamic information of the occupants.

Figure 2:
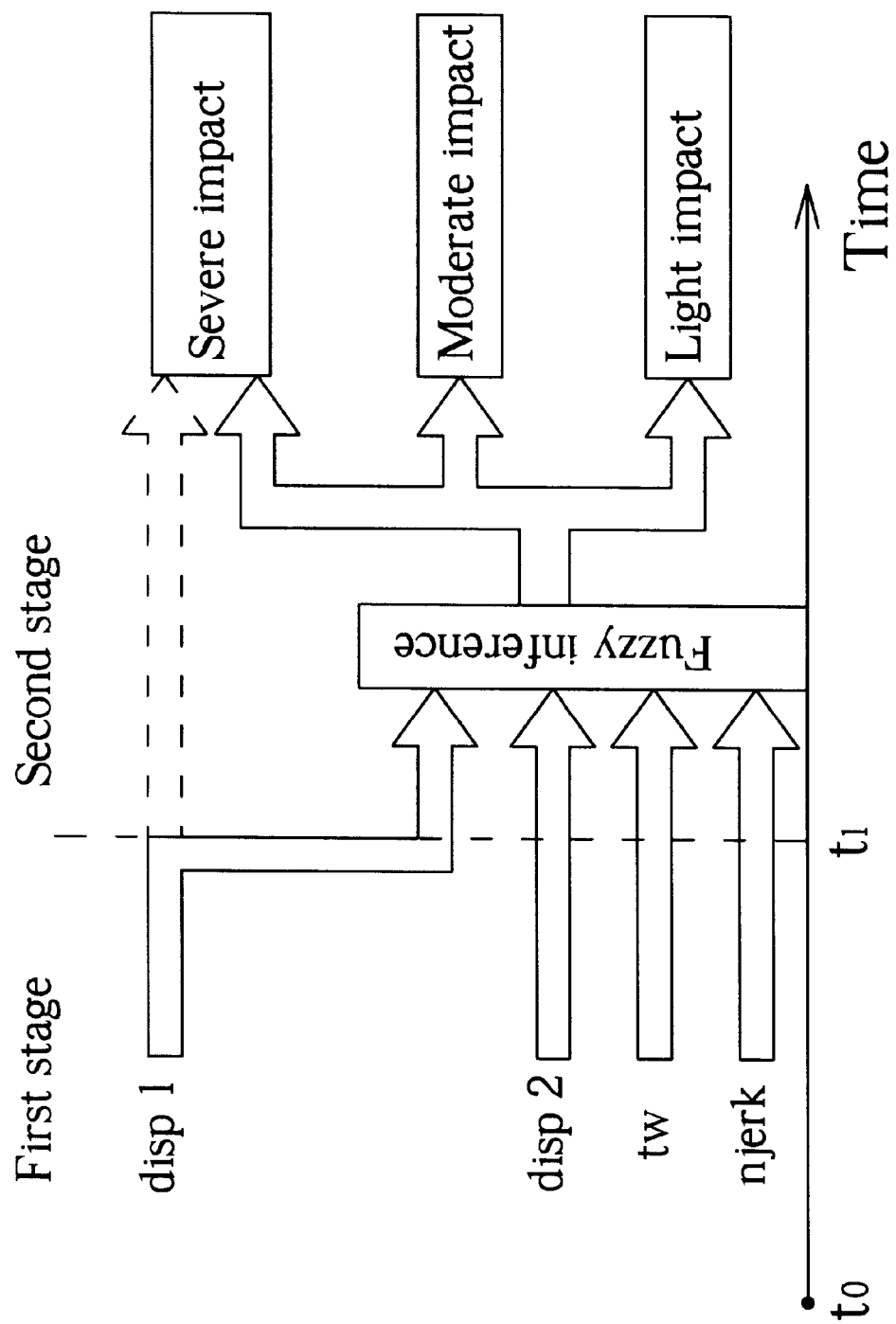
FIG. 2 is a control sequence diagram of the impact severity identification circuit as shown in FIG. 1.

Please refer to FIG. 2. FIG. 2 is a control sequence diagram of the impact severity identification circuit 16 as shown in FIG. 1. The algorithm used in the impact severity identification circuit 16 is a "Two Stages Fuzzy Control Algorithm". In the first stage ($t_0$~$t_1$), when the acceleration value of the digital acceleration signal G exceeds a predetermined start value during an impact, the impact severity identification circuit 16 will determine if the impact is a 'severe impact' based upon a displacement (disp1) generated from the double integral of the digital acceleration signal G during a predetermined period $t_1$. If the impact cannot be identified as a 'severe impact', then a second stage ($t_1$~) of computing begins. The differential of the digital acceleration signal G with respect to time is termed 'jerk'. A "cumulated number" (njerk) is defined as the number of times that the jerk exceeds a threshold value after the digital acceleration signal G exceeds the start value. A "time interval" (tw) is defined as the interval between the time that the digital acceleration signal G exceeds the start value and the jerk first exceeds the threshold value. In the second stage ($t_1$~), the impact severity identification circuit 16 will successively identify the impact severity of the vehicle 12 based upon the total displacement (disp2) generated by the digital acceleration signal G after the digital acceleration signal G exceeds the start value, the 'cumulated number' of times that the jerk of the acceleration signal exceeds the threshold value, and the 'time interval' that the jerk first exceeds the threshold value after the digital acceleration signal G exceeds the start value, until the identification signal S is generated and outputted. The impact severity of the second stage has three classifications of impact: "severe impact", "moderate impact", and "light impact".

Figure 3:
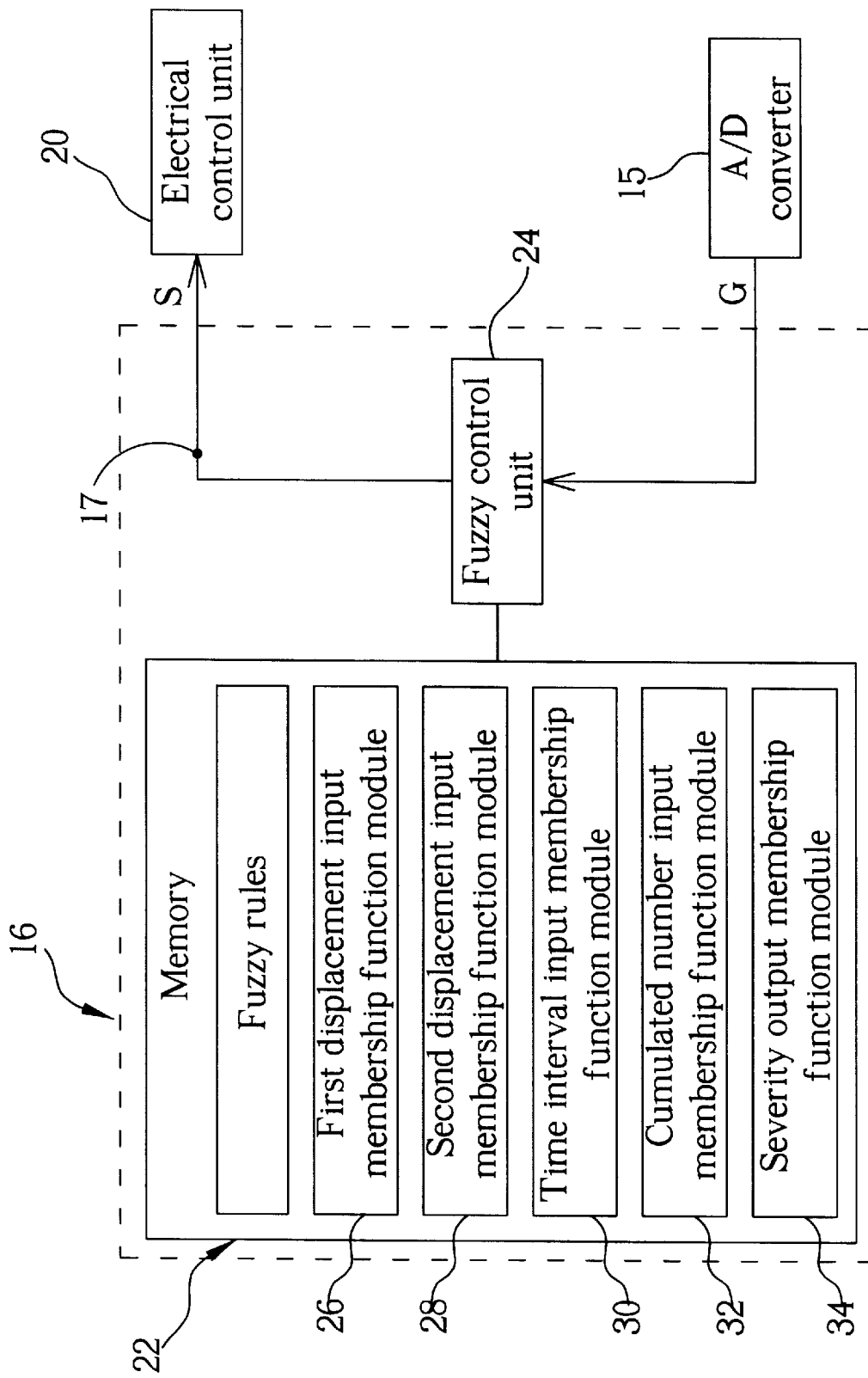
FIG. 3 is a functional block diagram of the impact severity identification circuit as shown in FIG. 1.

Please refer to FIG. 3. FIG. 3 is a functional block diagram of the impact severity identification circuit 16 as shown in FIG. 1. The impact severity identification circuit 16 comprises a memory 22 for storing a plurality of fuzzy rules, and a fuzzy control unit 24 electrically connected to the A/D converter 15 for transforming the digital acceleration signal G to the identification signal S representing the impact severity according to the plurality of fuzzy rules. The fuzzy control unit 24 takes the digital acceleration signal G generated by the A/D converter 15 and generates a first displacement fuzzy input variable 'disp1', a second displacement fuzzy input variable 'disp2', a time interval fuzzy input variable 'tw', and a cumulated number fuzzy input variable 'njerk'. The first displacement fuzzy input variable 'disp1' represents the displacement generated from the acceleration signal during the predetermined period $t_1$ after the digital acceleration signal exceeded the start value, and the displacement is generated from the double integral of the digital acceleration signal G with respect to time. The second displacement fuzzy input variable 'disp2' represents the total displacement since the acceleration signal exceeded the start value. The time interval fuzzy input variable 'tw' represents the time interval from the time that the acceleration signal exceeded the start value to the first time that the jerk of the acceleration signal exceeded the threshold value. The cumulated number fuzzy input variable 'njerk' represents the number of times that the jerk of the acceleration signal exceeds the threshold value after the acceleration signal exceeded the start value.

Fuzzy rules are used to define the if-then relationship between the first displacement fuzzy input variable 'disp1', the second displacement fuzzy input variable 'disp2', the time interval fuzzy input variable 'tw', and the cumulated number fuzzy input variable 'njerk' to an impact severity fuzzy output variable 'svty'. The fuzzy control unit 24 will transform the membership grades of the first displacement fuzzy input variable 'disp1', the second displacement fuzzy input variable 'disp2', the time interval fuzzy input variable 'tw', and the cumulated number fuzzy input variable 'njerk' to the impact severity fuzzy output variable 'svty' membership grade according to the inference of fuzzy rules.

As shown in FIG. 3, the impact severity identification circuit 16 further comprises a first displacement input membership function module 26, a second displacement input membership function module 28, a time interval input membership function module 30, a cumulated number input membership function module 32, and a severity output membership function module 34. The first displacement input membership function module 26 is stored in the memory 22 and is used to transform the first displacement fuzzy input variable 'disp1' to a first displacement fuzzy value '$f_{disp1}$' according to a first displacement input membership function $\mu$ (disp1). The second displacement input membership function module 28 is stored in the memory 22 and is used to transform the second displacement fuzzy input variable 'disp2' to a second displacement fuzzy value '$f_{disp2}$' according to a second displacement input membership function $\mu$ (disp2). The time interval input membership function module 30 is stored in the memory 22 and is used to transform the time interval fuzzy input variable 'tw' to a time interval fuzzy value '$f_{tw}$' according to a time interval input membership function $\mu$ (tw). The cumulated number input membership function module 32 is stored in the memory 22 and is used to transform the cumulated number fuzzy input variable 'njerk' to a cumulated number fuzzy value '$f_{njerk}$' according to a cumulated number input membership function $\mu$ (njerk). The severity output membership function module 34 is stored in the memory 22 and is used to transform a severity fuzzy value '$f_{svty}$' generated from a severity output membership function $\mu$ (svty), after being defuzzified by using the center of area (COA) defuzzification method, to a severity output value, i.e. the impact severity fuzzy output variable 'svty'. The severity fuzzy value '$f_{svty}$' is corresponding to the minimum grade of the first displacement fuzzy value '$f_{disp1}$', the second displacement fuzzy value '$f_{disp2}$', the time interval fuzzy value '$f_{tw}$', and the cumulated number fuzzy value '$f_{njerk}$'. Hence, the fuzzy control unit 24 transforms the severity fuzzy value '$f_{svty}$' into the identification signal S, which represents the impact severity of the vehicle 12, i.e. the value of the impact severity fuzzy output variable 'svty', and then outputs it at the output port 17.

When the vehicle 12 suffers a collision, the acceleration detector 14 of the vehicle impact severity identification device 10 will first generate the acceleration signal G' according to the deceleration of the vehicle 12 along the direction of motion. Then, the A/D converter 15 will convert the acceleration signal G' into the digital acceleration signal G. Finally, the impact severity identification circuit 16, based on a "two stages fuzzy control algorithm" design, will identify the impact severity of the vehicle 12 according to the digital acceleration signal G, and generate the identification signal S, which is one of the control signals of the electrical control unit 20 for triggering the airbag device 18.

Figure 4:
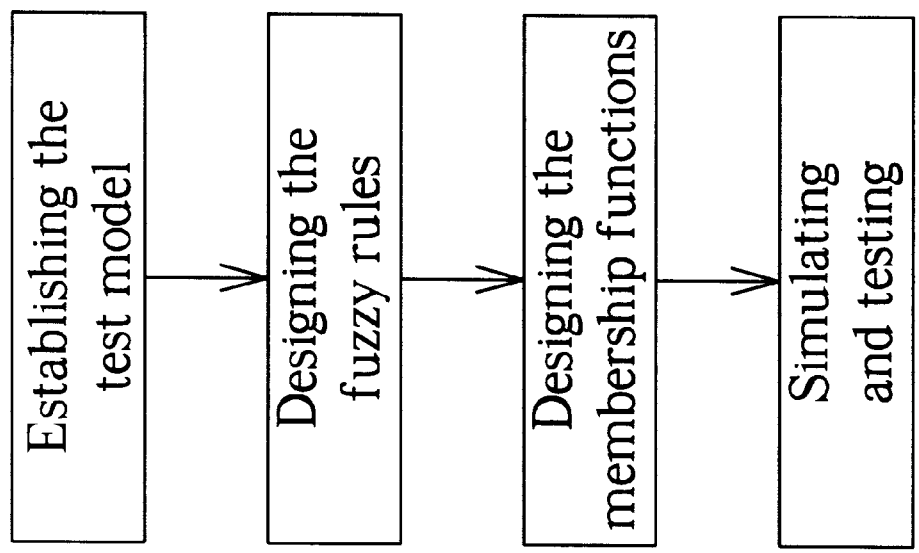
FIG. 4 is a design flow chart of the impact severity identification circuit as shown in FIG. 3.

Please refer to FIG. 4. FIG. 4 is a design flow chart of the impact severity identification circuit 16 as shown in FIG. 3. The impact severity identification circuit 16 of the vehicle impact severity identification device 10 is designed based on a "two stages fuzzy control algorithm". The design process of the impact severity identification circuit 16 comprises four steps: establishing the test model, designing the fuzzy rules, designing the membership functions, and simulating and testing, as shown in FIG. 4.

The purpose of the establishment of the test model is to obtain experimental data so that the physical acceleration characteristics detected by the acceleration detector 14 during a collision can be simulated on a computer program. The design of the impact severity identification circuit 16 in this embodiment adopts two impact pulse data sets, AKF1 and AKF2, from a branch of the Autoliv in France; two data sets at 30 mph and rough roads from reference A (A Predictive Based Algorithm for Actuation of an Airbag, T. Gioutsos, Automotive System Lab., Inc. SAE920479); and two data sets at 17 mph and 8 mph from reference B (The Use of Signal Processing Techniques in an Occupant Detection System, E. J. Gillis, T. Gioutsos, Automotive System Lab., Inc. SAE940906). These data are used to determine four physical characteristics, i.e. the first displacement fuzzy input variable 'disp1', the second displacement fuzzy input variable 'disp2', the time interval fuzzy input variable 'tw', and the cumulated number fuzzy input variable 'njerk'. By analyzing these physical characteristics, their relationships to impact severity can be found, and they serve as a foundation of the design of the fuzzy rules of the impact severity identification circuit 16.

Please refer to FIG. 5. FIG. 5 is a table of the fuzzy rules of the impact severity identification circuit 16 shown in FIG. 4. The plurality of fuzzy rules of the vehicle impact severity identification device 10 are the kernel of the impact severity identification circuit 16. Each fuzzy rule has the form of "if . . . then . . . ". The part "if . . . " describes the input state of the impact severity identification circuit 16, and the part "then . . . " describes the reaction state of the impact severity identification circuit 16. Each fuzzy rule can induce a fuzzy value by a fuzzy inference process, and the fuzzy values will be translated to the digital values by a defuzzification process. To make the fuzzy rules more precise to deal with various types of impacts, the impact severity identification circuit 16 adopts the "two stages fuzzy control algorithm", which is described below.

The design of the first stage fuzzy rules utilizes the first displacement fuzzy input variable 'disp1' to determine if the impact is a severe impact. If it is not a severe one according to the first displacement fuzzy input variable 'disp1', the impact severity identification circuit 16 will stay in a "waiting" state. When the acceleration value of the digital acceleration signal G exceeds the predetermined start value during the impact, the fuzzy control unit 24 of the impact severity identification circuit 16 will begin calculating the displacement during the predetermined period, generating the first displacement fuzzy input variable 'disp1'. If the first displacement fuzzy input variable 'disp1' exceeds a predetermined value, then the impact severity identification circuit 16 will identify the impact as a severe impact; if the first displacement fuzzy input variable 'disp1' is lower than the predetermined value, then the impact severity identification circuit 16 will decide later, rather than at that moment. That means the impact severity identification circuit 16 will decide if the impact is severe in the second stage.

The design of the second stage fuzzy rules utilizes the first displacement fuzzy input variable 'disp1', the second displacement fuzzy input variable 'disp2', the time interval fuzzy input variable 'tw', and the cumulated number fuzzy input variable 'njerk' to determine if the impact is a "severe impact", a "moderate impact", or a "light impact". If the impact severity identification circuit 16 identifies the impact as not a severe one during the predetermined period, then the fuzzy control unit 24 of the impact severity identification circuit 16 will successively calculate the total displacement generated from the digital acceleration signal G since the digital acceleration signal G exceeded the predetermined start value, i.e. the second displacement fuzzy input variable 'disp2', the number of times that a jerk of the digital acceleration signal G exceeds the threshold value since it exceeded the predetermined start value, i.e. the cumulated number fuzzy input variable 'njerk', and the time interval that the jerk first exceeds the threshold value since the digital acceleration signal G exceeds the predetermined start value, i.e. the time interval fuzzy input variable 'tw'. These four factors are used as the foundation for identifying the impact severity in the second stage.

Based on the aforementioned first and second stage fuzzy rule design philosophy, 10 fuzzy rules can be constructed in the impact severity identification circuit 16 of the vehicle impact severity identification device 10, as shown in FIG. 5.

Please refer to FIG. 6. FIG. 6 is a correspondence table of linguistic terms and fuzzy variables of the impact severity identification circuit 16 shown in FIG. 3. The fuzzy variables of the impact severity identification circuit 16 comprises the first displacement fuzzy input variable 'disp1', the second displacement fuzzy input variable 'disp2', the cumulated number fuzzy input variable 'njerk', the time interval fuzzy input variable 'tw', and the impact severity fuzzy output variable 'svty'. The first displacement fuzzy input variable 'disp1' is designed to comprise 5 linguistic terms: very_low, low, medium, high, and very_high. The second displacement fuzzy input variable 'disp2', the cumulated number fuzzy input variable 'njerk', the time interval fuzzy input variable 'tw', and the impact severity fuzzy output variable 'svty' are designed to comprise 3 linguistic terms: low, medium, and high, as shown in FIG. 6. Each membership function of the linguistic terms is a triangle-shaped function.

Figure 7:
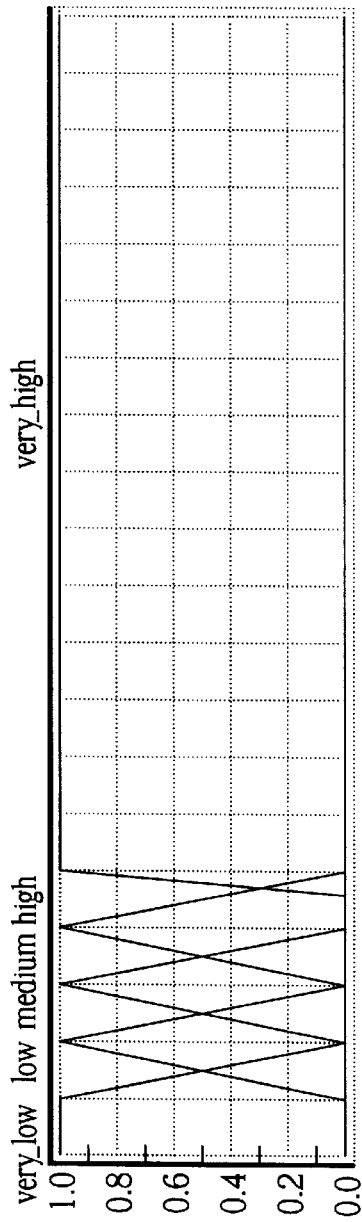
FIG. 7 is a graph of the first displacement input membership function $\mu$ (disp1) of the impact severity identification circuit as shown in FIG. 3.
Figure 8:
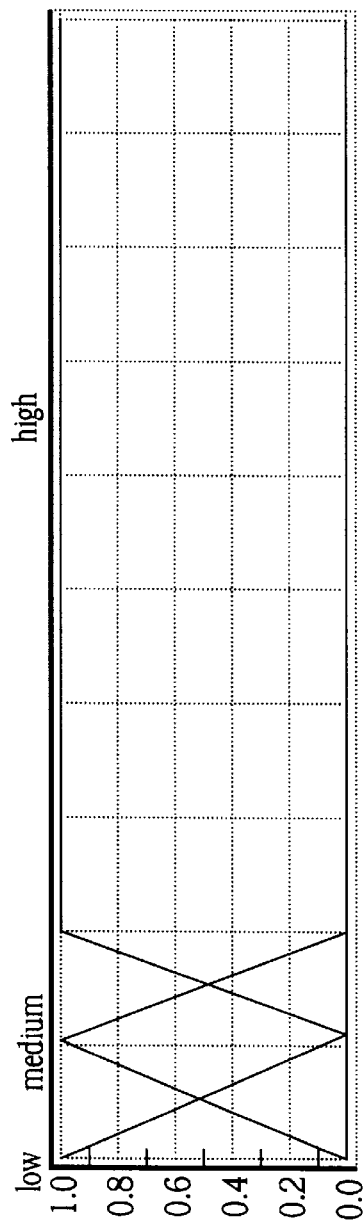
FIG. 8 is a graph of the second displacement input membership function $\mu$ (disp2) of the impact severity identification circuit as shown in FIG. 3.
Figure 9:
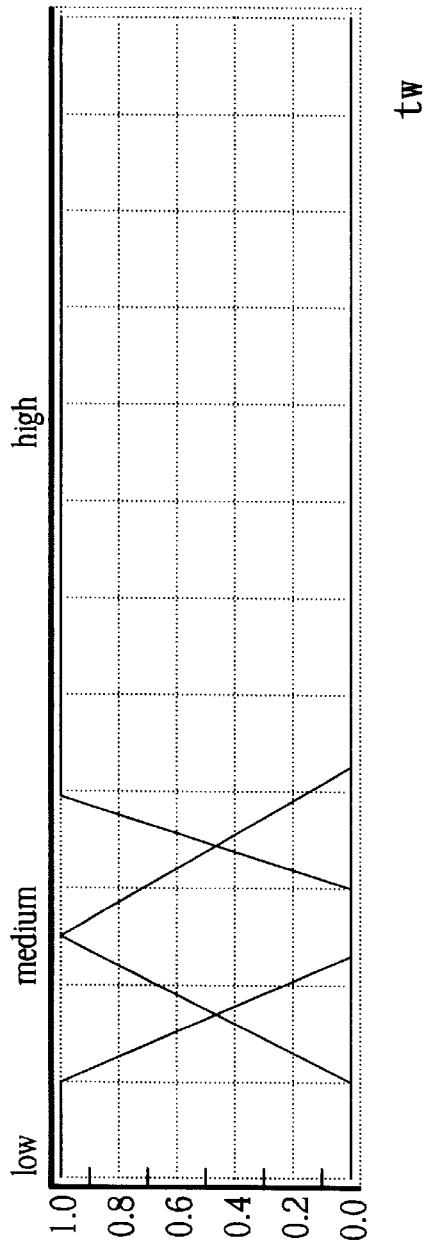
FIG. 9 is a graph of the time interval input membership function $\mu$ (tw) of the impact severity identification circuit as shown in FIG. 3.
Figure 10:
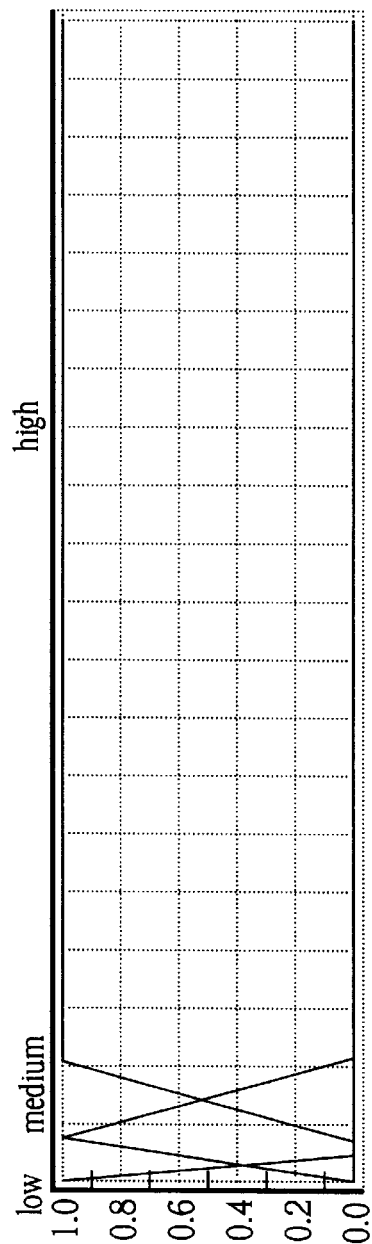
FIG. 10 is a graph of the cumulated number input membership function $\mu$ (njerk) of the impact severity identification circuit as shown in FIG. 3.
Figure 11:
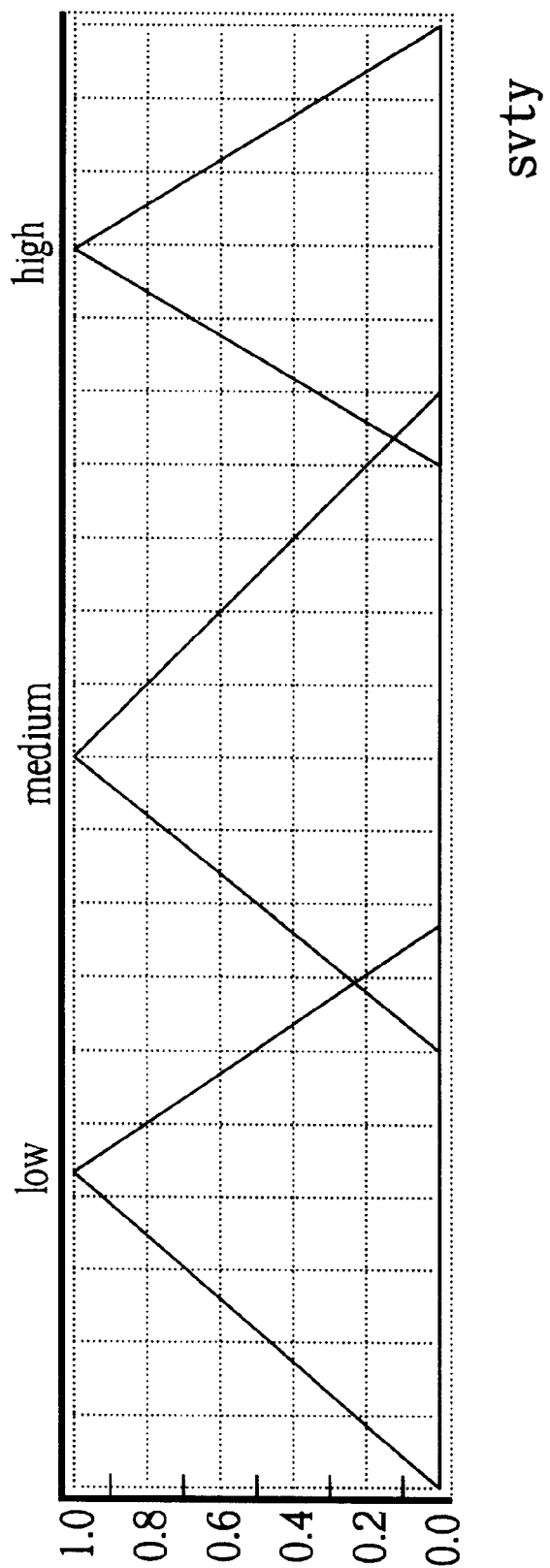
FIG. 11 is a graph of the severity output membership function $\mu$ (svty) of the impact severity identification circuit as shown in FIG. 3.

Please refer to FIG. 7 to FIG. 11. FIG. 7 is a graph of the first displacement input membership function $\mu$ (disp1) of the impact severity identification circuit 16 as shown in FIG. 3. FIG. 8 is a graph of the second displacement input membership function $\mu$ (disp2) of the impact severity identification circuit 16 as shown in FIG. 3. FIG. 9 is a graph of the time interval input membership function $\mu$ (tw) of the impact severity identification circuit 16 as shown in FIG. 3. FIG. 10 is a graph of the cumulated number input membership function $\mu$ (njerk) of the impact severity identification circuit 16 as shown in FIG. 3. FIG. 11 is a graph of the severity output membership function $\mu$ (svty) of the impact severity identification circuit 16 as shown in FIG. 3. An input membership function is used to define the "if . . . " part of the fuzzy inference with respect to the control input parameters. The embodiment adopts the physical characteristics of disp1, disp2, tw, and njerk, as the fuzzy input variables. According to the analysis and testing results of the above-mentioned test model, the input membership functions according to these fuzzy input variables are designed as shown in FIGS. 7 to 10. The first displacement input membership function $\mu$ (disp1) is shown in FIG. 7. The second displacement input membership function $\mu$ (disp2) is shown in FIG. 8. The time interval input membership function $\mu$ (tw) is shown in FIG. 9. The cumulated number input membership function $\mu$ (njerk) is shown in FIG. 10. Furthermore, an output membership function is used to define the "then . . . " part of the fuzzy inference. Because the impact severity identification circuit 16 is used to identify the impact severity, a severity output membership function μ (svty) that represents an output parameter is presented, as shown in FIG. 11.

The goal of simulating and testing is to verify if the impact severity can be identified in a timely manner by the impact severity identification circuit 16 under various types of impacts. Hereinafter, the presented test model, fuzzy rules, membership functions, and the use of "Two Stages Fuzzy Control Algorithm" are tested using the previously mentioned impact data to verify the practicability and precision of the impact severity identification circuit 16 of the vehicle impact severity identification device 10 according to the present invention.

Please refer to FIG. 12 to FIG. 17. FIG. 12 is a table of the testing results of the impact severity identification circuit 16 based on the impact pulse data set AKF1. FIG. 13 is a table of the testing results of the impact severity identification circuit 16 based on the impact pulse data set AKF2. FIGS. 14 to 17 are testing results of the impact severity identification circuit 16 based on the impact data sets at 30 mph, rough road, 17 mph, and 8 mph. The analysis of the testing results based on the two impact pulse data sets AKF1 and AKF2 from a branch of the Autoliv in France, and the impact data sets at 30 mph, rough roads, 17 mph, and 8 mph from references A and B is described below:

(1) According to tests based on 52 sets of data from AKF1, as shown in FIG. 12, the testing results are desirable.

(2) According to tests based on 15 sets of data from AKF2, as shown in FIG. 13, each of the testing results is successful.

Figure 14:
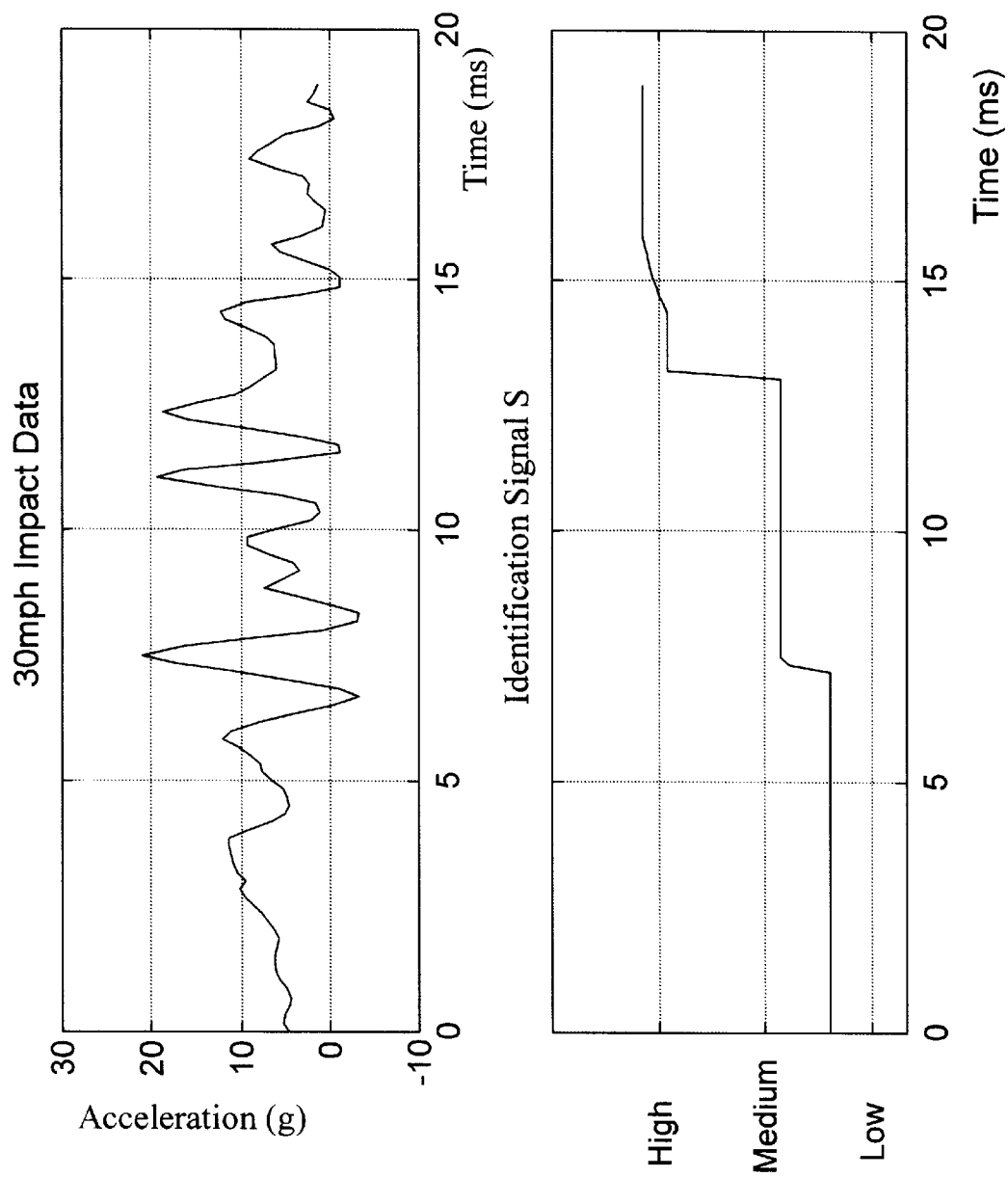
FIGS. 14 to 17 are testing results of the impact severity identification circuit based on impact data sets at 30 mph, rough road, 17 mph, 8 mph.
Figure 15:
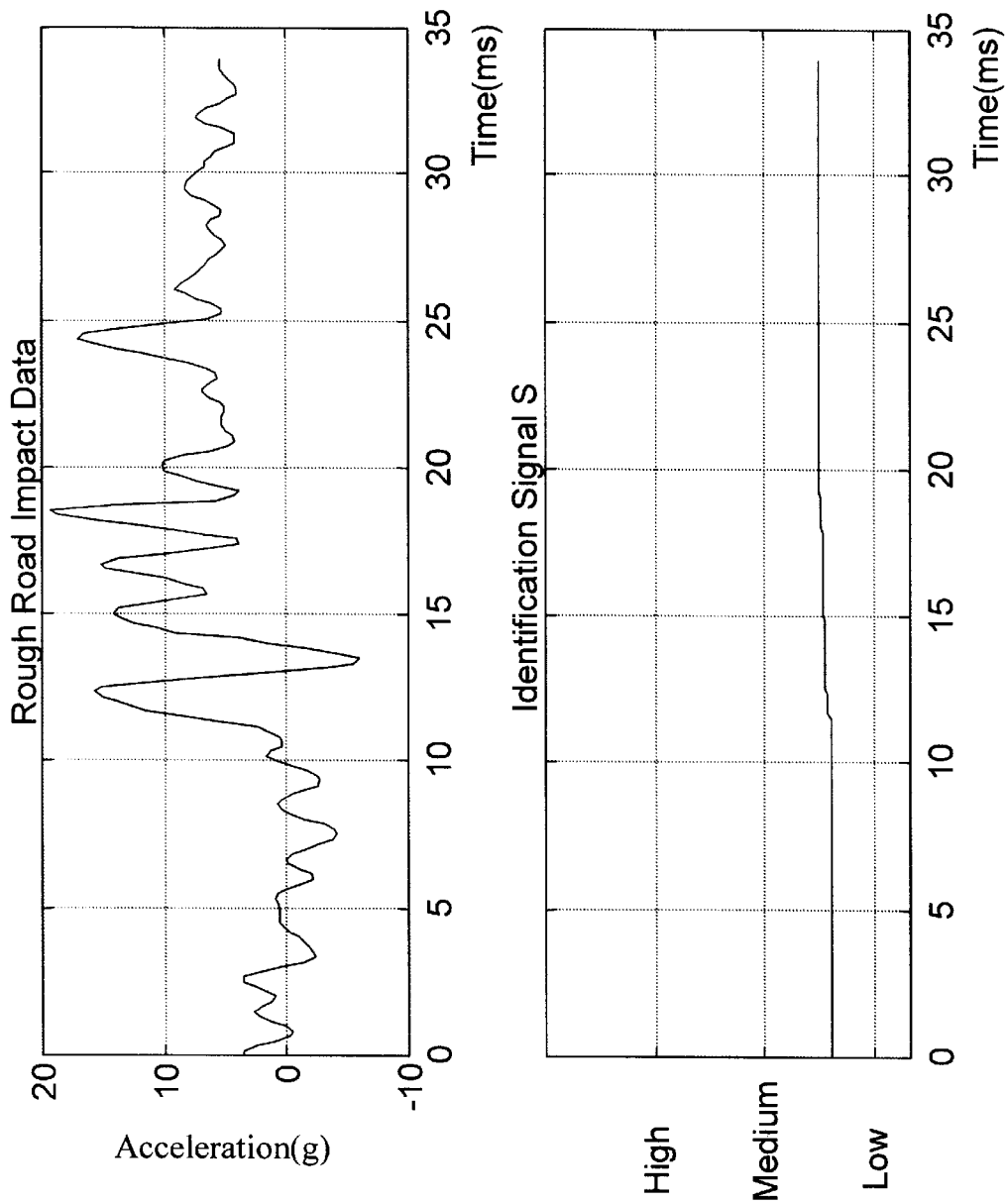
Figure 16:
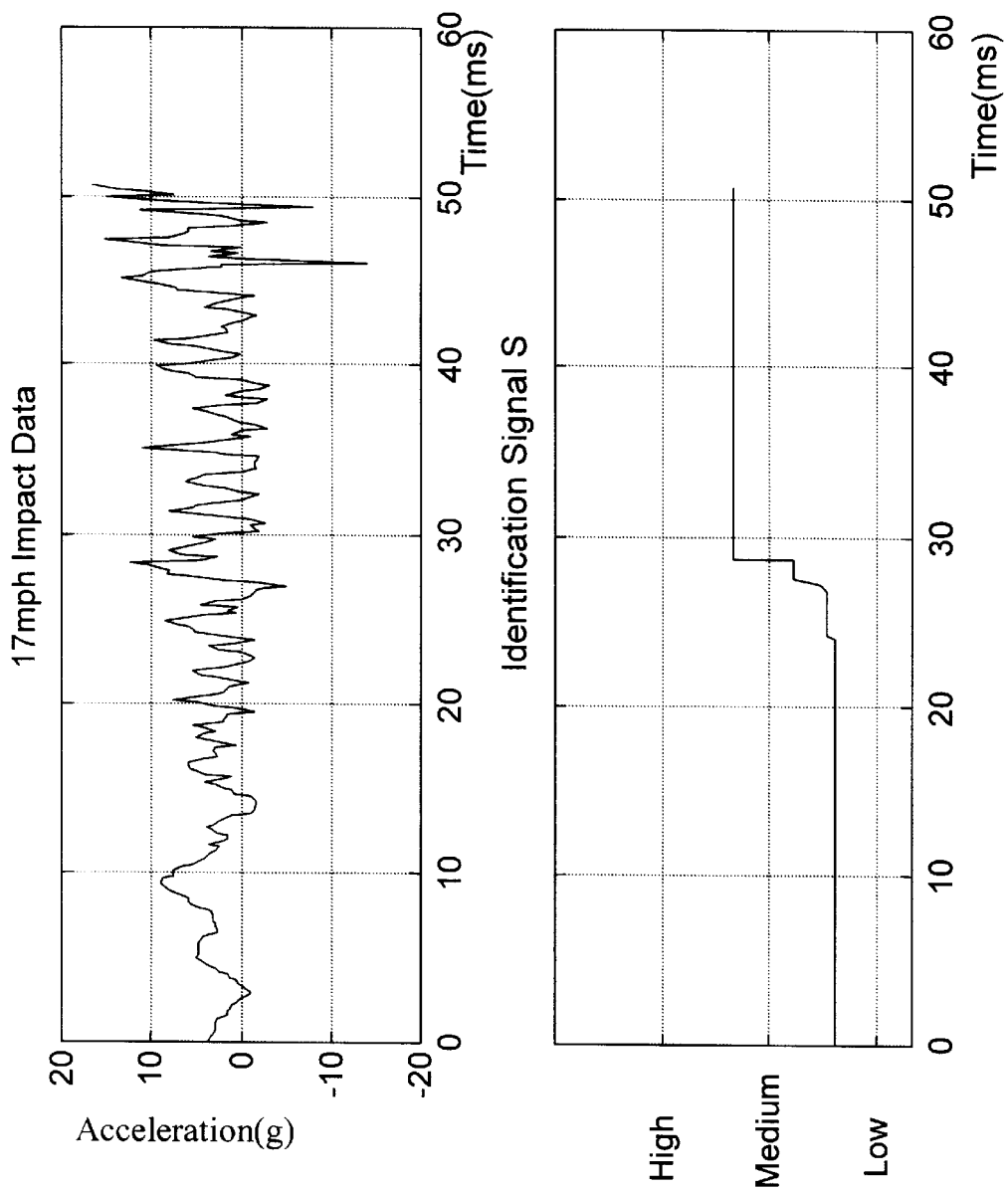
Figure 17:
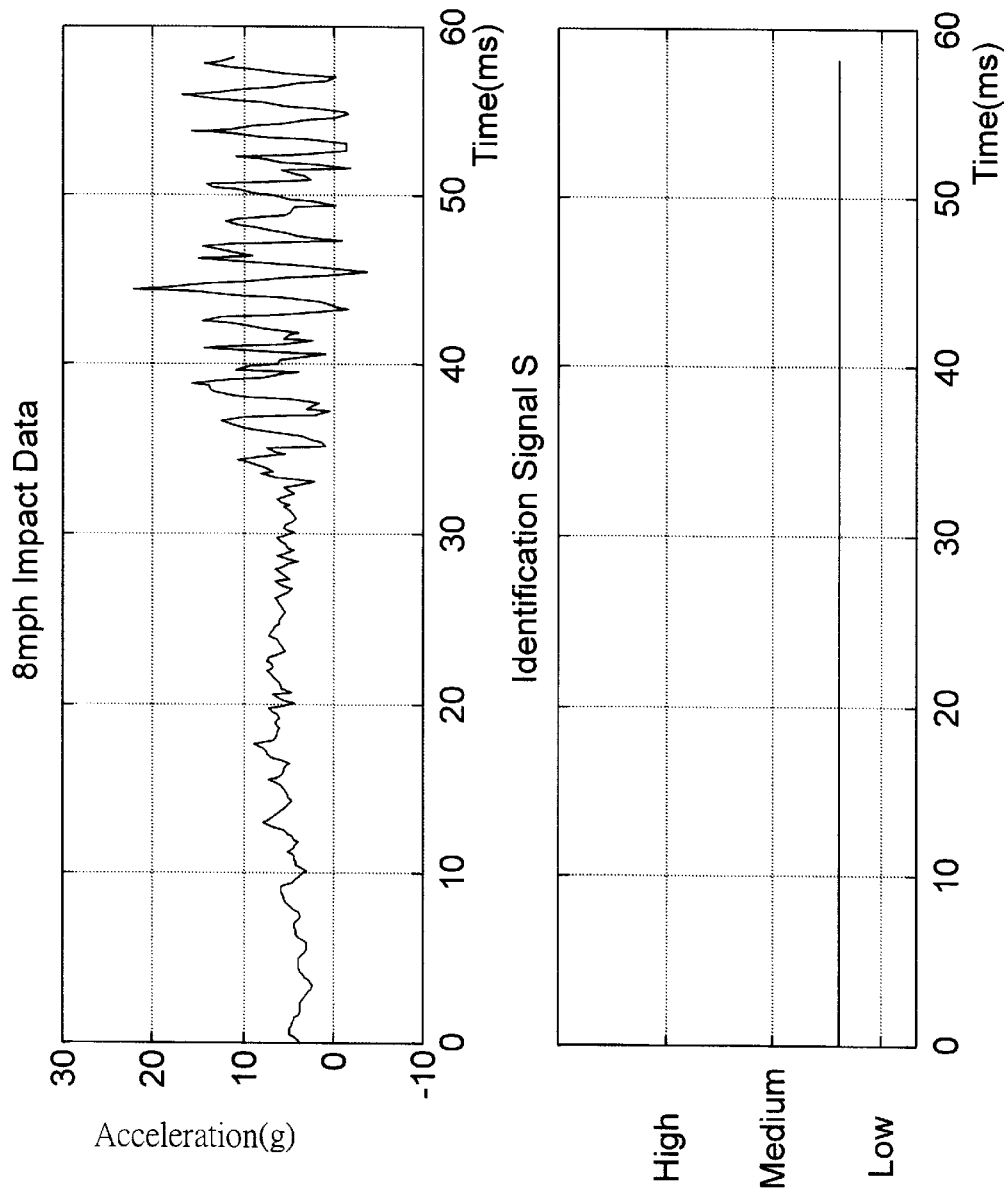

(3) According to tests based on the impact data sets at 30 mph, rough roads, 17 mph, and 8 mph from references A and B, each of the testing results is successful, as shown in FIGS. 14 to 17. During the impact test at 30 mph, a severe impact is identified at 15 ms, 3.8 ms faster than the result of reference A at 18.8 ms, as shown in FIG. 14. During the rough road impact testing, a light impact was consistently identified, as shown in FIG. 15. During the impact test at 17 mph, a moderate impact is identified at 28 ms, as shown in FIG. 16. For impact testing at 8 mph, as shown in FIG. 17, a light impact is consistently identified. These results show that a moderate impact can be distinguished from two similar impact waves mentioned in reference B.

According to the above simulating and testing results, the impact severity identification circuit 16, using a "Two Stages Fuzzy Control Algorithm", can correctly distinguish various types of impact waves. In reference A, the conception of jerk is introduced to distinguish between the impact severity at 30 mph and on rough roads, as the rate of change of velocity cannot do this. Reference A, however, provides no algorithmic methods for distinguishing impact severity. Reference B provides a method that uses signal processing noise reduction methods, and occupant position sensors for detecting the displacement of occupants, to distinguish between severe and light impact waves with similar shapes. Reference B does not, however, mention trigger times. The vehicle impact severity identification device 10 according to the present invention adopts a "Two Stages Fuzzy Control Algorithm" possessing the functions of "prediction" and "distinction" so that it can distinguish between various types of impact waves and trigger the airbag in a timely manner. In the impact testing at 30 mph from reference A, the present invention identifies the impact severity 3.8 ms earlier than the device in reference A. In rough road testing, the present invention can distinguish rough road impacts from other types of impacts. The vehicle impact severity identification device 10 can also distinguish the 17 mph impact wave from the 8 mph impact wave, which are similar to each other, and trigger an airbag within 30 ms if it determines that the impact is "moderate". These testing results show the timeliness and distinguishing abilities of the "Two Stages Fuzzy Control Algorithm". It can be used inmost kinds of frontal impacts and its impact identification abilities are desirable.

Compared to the prior art method, the vehicle impact severity identification device 10 according to the present invention adopts a "Two Stages Fuzzy Control Algorithm" in the design of the impact severity identification circuit 16. In the first stage, the impact severity identification circuit 16 will identify if the impact is a severe impact based upon a displacement generated from the digital acceleration signal G during a predetermined period. If the impact is not a severe impact or cannot be determined, the impact severity identification circuit 16 will successively identify if the impact is severe, moderate, or light according to the fuzzy input variables 'disp1', 'disp2', 'tw', and 'njerk' as mentioned above. Moreover, according to simulating and testing results of the two impact pulse data sets AKF1 and AKF2 from a branch of the Autoliv in France, and four typical impact data sets from references A and B, the vehicle impact severity identification device 10 according to the present invention is both timely and has good frontal impact severity distinguishing abilities.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A vehicle impact severity identification device for identifying the front-impact severity of a vehicle, the vehicle impact severity identification device comprising:

an acceleration detector installed in the vehicle for detecting the acceleration of the vehicle and generating an acceleration signal; and an impact severity identification circuit installed in the vehicle and electrically connected to the acceleration detector for identifying the impact severity of the vehicle, the identification circuit using the acceleration signal generated by the acceleration detector and generating an impact severity identification signal at an output port of the impact severity identification circuit;

wherein, during an impact, when the acceleration value of the acceleration signal exceeds a predetermined start value, the impact severity identification circuit will identify whether the impact is a severe impact based on a displacement generated from the acceleration signal during a predetermined period; wherein, if the impact is not a severe impact or can not be determined, then the impact severity identification circuit will successively identify the impact severity based upon the displacement generated by the acceleration signal, a cumulated number of times that a jerk of the acceleration signal exceeds a threshold value, and the time interval that the jerk first exceeds the threshold value, until the identification signal is generated and outputted.

2. The impact severity identification device of claim 1 wherein the 'cumulated number' is the number of times that the jerk, the differential of the acceleration signal with respect to time, exceeds the threshold value, and the 'time interval' is the interval between the time that the acceleration signal first exceeds the start value and the jerk first exceeds the threshold value.

3. The impact severity identification device of claim 1 wherein when the impact severity identification circuit identifies that the impact is not a severe impact at the end of the predetermined period, the impact severity identification circuit will successively identify the impact severity according to the total displacement generated from the acceleration signal since the acceleration signal exceeded the predetermined start value, and the cumulated number of times that the jerk of the acceleration signal exceeds the threshold value since the acceleration signal exceeded the predetermined start value, until the identification signal is generated and outputted.

4. The impact severity identification device of claim 1 wherein the impact severity identification circuit will identify the impact severity according to the time interval from the time that the acceleration signal exceeds the start value to the time that the jerk of the acceleration signal exceeds the threshold value, and the displacement generated from the acceleration signal during the predetermined period, until the identification signal is generated and outputted.

5. The impact severity identification device of claim 1 wherein when the impact severity identification circuit identifies that the impact is a severe impact according to the displacement of the acceleration signal during the predetermined period, the impact severity identification circuit will output the identification signal that represents a severe impact at its output port.

6. The impact severity identification device of claim 1 wherein the impact severity identification circuit comprises:

a memory for storing a plurality of fuzzy rules; and a fuzzy control unit electrically connected to the acceleration detector through an analog-to-digital converter for transforming the acceleration signal to the identification signal according to the plurality of fuzzy rules.

7. The impact severity identification device of claim 6 wherein, according to the acceleration signal generated by the acceleration detector, the fuzzy control unit will generate a first displacement fuzzy input variable representing the displacement generated from the acceleration signal during the predetermined period, a second displacement fuzzy input variable representing the total displacement since the acceleration signal exceeded the start value, a time interval fuzzy input variable representing the time interval from the time that the acceleration signal exceeded the start value to the time that the jerk of the acceleration signal exceeded the threshold value, and a cumulated number fuzzy input variable representing the number of times that the jerk of the acceleration signal exceeded the threshold value after the acceleration signal exceeded the start value, and the fuzzy control unit will transform the first displacement fuzzy input variable, the second displacement fuzzy input variable, the time interval fuzzy input variable, and the cumulated number fuzzy input variable to an impact severity fuzzy output variable according to the plurality of fuzzy rules, and the fuzzy control unit will transform the impact severity fuzzy output variable to the identification signal.

\* \* \* \* \*

UNITED STATES PATENT AND TRADEMARK OFFICE
CERTIFICATE OF CORRECTION

PATENT NO. : 6,275,755 B1  
DATED : August 14, 2001  
INVENTOR(S) : Yi-Jen Mon et al.

It is certified that error appears in the above-identified patent and that said Letters Patent is hereby corrected as shown below:

<u>Title page,</u>  
Item [73], Assignee should read: -- Chung Shan Institute of Science and Technology --

Signed and Sealed this

Third day of September, 2002

Attest:

Attesting Officer

JAMES E. ROGAN  
*Director of the United States Patent and Trademark Office*